(No Model.)
A. W. GETCHELL.
MOTOR FOR STREET CARS.
No. 368,825. Patented Aug. 23, 1887.
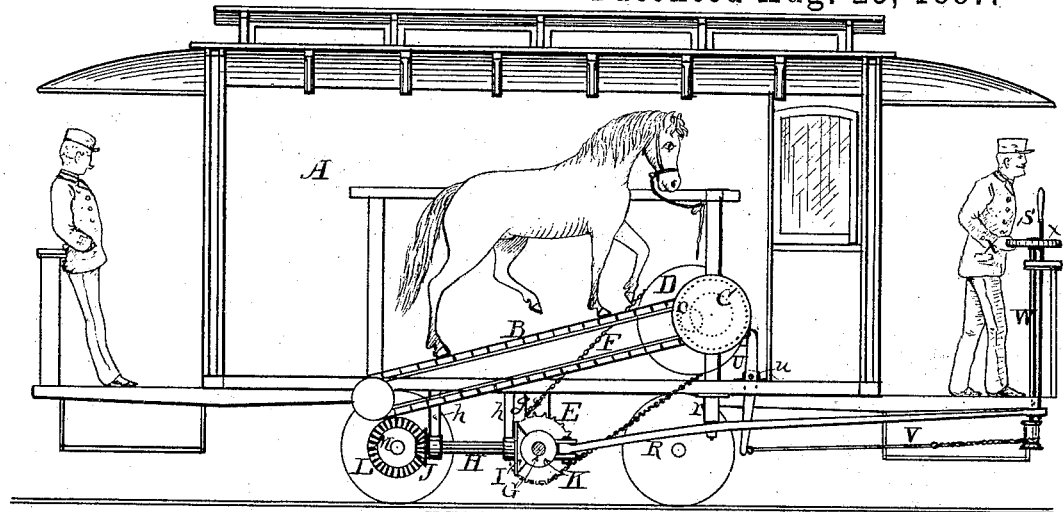
Fig. 1.
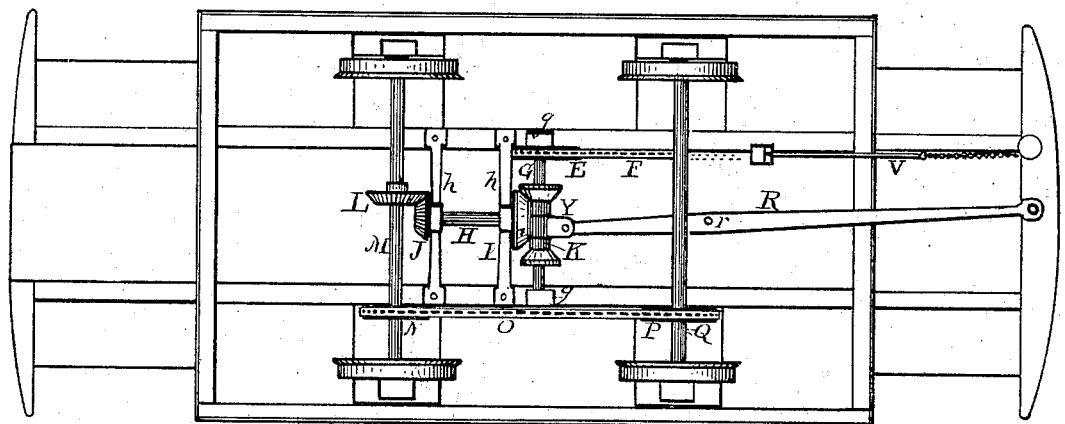
Fig. 3.
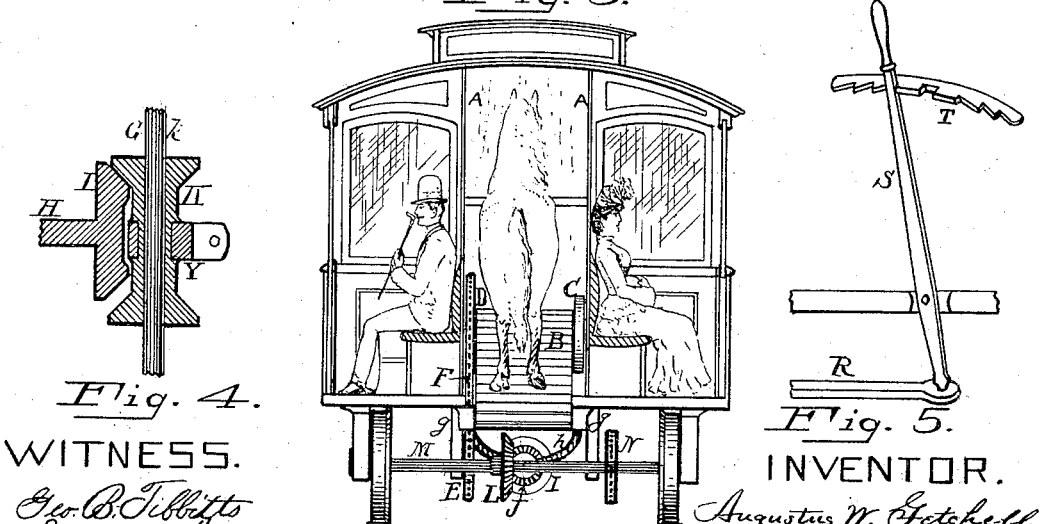
Fig. 4.
Fig. 2.
Fig. 5.
WITNESS.
Geo. B. Tibbitts
Ida M. Warren
INVENTOR.
Augustus W. Getchell
by Geo. W. Tibbitts
Atty.
N. PETERS, Photo-Lithographer, Washington, D.C.

United States Patent Office.

AUGUSTUS W. GETCHELL, OF CLEVELAND, OHIO.

MOTOR FOR STREET-CARS.

SPECIFICATION forming part of Letters Patent No. 368,825, dated August 23, 1887.

Application filed May 7, 1887. Serial No. 237,411. (No model.)

*To all whom it may concern:*

Be it known that I, AUGUSTUS W. GETCHELL, of Cleveland, in the county of Cuyahoga and State of Ohio, have invented certain new and useful Improvements in Motors for Street-Cars, of which the following is a specification.

This invention relates to motors for propelling street-railway cars, and has for its object to increase the speed and reduce the cost of propelling cars.

The invention consists in the combination and arrangement of a horse-power mechanism with the running-gear of the car, substantially in the manner hereinafter described, and pointed out in the claims.

In the drawings, Figure 1 is a vertical longitudinal section of a street-car having my improvements attached. Fig. 2 is a vertical cross-section of the same. Fig. 3 is a plan view of the under side of the car, showing the method of applying my improvements to the running-gear. Fig. 4 is a detached sectional view of a shifting friction bevel-gear for reversing the movements of the car. Fig. 5 is a detached view of the reversing-lever.

The accompanying drawings illustrate a street-car of the usual general exterior feature as to form and finish, the interior being modified to adapt it to my improvements for propulsion.

To the interior I provide a central apartment for the motor and motive power by longitudinal partitions A A, extending nearly the whole length of the body of the car from the rear end to the front, leaving a sufficient space in the front end of the car to pass from one side apartment to the other, and I arrange the seats for the passengers in the said side apartments against the said partitions A A, so that the passengers face outwardly. The car is also provided with the usual front and rear platforms and steps. The front end of the car-body is provided with one door leading from the platform into the car in the usual manner, while the rear end is provided with three doors, the two side doors leading from the platform into the side apartments, the middle door leading into the middle apartment. In the said middle apartment I place a tread horse-power, consisting of an endless-belt tread, B, running on rollers journaled in suitable frame-work attached to the floor of the car. The lower end of said endless-belt tread is set into a hole or depression in the floor, thus bringing the lower end of the tread on a level with the floor, while the upper end of the tread is supported a considerable distance above the floor, thereby giving quite an inclination to the said endless-belt tread. The upper end of said endless-belt tread operates gears C c, and from which motion is transmitted to the running-gear beneath the car.

c is a pinion on the end of the upper belt-roller and meshes with teeth on the inside of a rim on the gear C, which is carried by a shaft parallel with the said roller. On the opposite end of the same shaft is a sprocket-wheel, D, from which motion is conveyed to a sprocket-wheel, E, beneath the floor by a chain belt, F. Said sprocket E is carried by a shaft, G, journaled in suitable hangers, g g, secured to the under side of the car-body.

H is a short counter-shaft journaled in hangers h h, and has a bevel friction-gear, I, on one end and a bevel toothed gear, J, on the other end. On the shaft G is placed a spool-shaped sleeve, K, having a longitudinal groove fitting over a feather, k, on the side of the shaft, whereby said spool may be shifted longitudinally on the shaft, but must turn with it, the purpose of which is to enable the beveled heads of the spool to be brought alternately in contact with the bevel-gear I for changing the direction of the movements of the car either forward or backward, as may be required. The toothed gear J meshes with and is always in contact with a gear, L, on the axle M of the car.

N is a sprocket-wheel on the axle M, connected by a chain belt, O, with a similar sprocket-wheel, P, on the other axle, Q.

By the mechanism thus described motion is imparted from the motor to the car. The motive power employed is that of a horse walking on the aforesaid endless tread.

The shifting mechanism consists of a strong lever, R, fulcrumed at r to a short post or block attached to the car body or frame, the short arm of said lever being pivoted to a yoke, Y, on the sleeve or spool K, the long arm extending forward underneath the front platform, where it is connected to another powerful upright hand-lever, S, fulcrumed at the floor and extending up to the hand-rail of the car, where there is provided a rack-bar, T, designed for catching and holding said hand-lever in either the upright or side-tilted positions.

A brake mechanism for stopping the motor and the car is provided, consisting of a strong lever, U, fulcrumed at u to the floor, the upper end of which has a brake-shoe engaging with a flange or rim on the wheel D. The long arm of said lever U extends below the floor, and is connected by a rod and chain, V, to a spool, w, on a vertical brake-shaft, W, attached to the front part of the platform, and provided with a hand-wheel, X, for turning it by.

The middle portion of the rear platform is made in the form of a trap to let down to provide a means for the horse to walk up into the middle apartment, and when he passes in the door to said apartment is closed, the trap raised, and the horse is shut in out of sight.

The operation of this mechanism is as follows: One man on the front platform manages and controls all the movements both in starting and stopping the car. The weight of the horse starts the motor, and the continued walking of the horse keeps up the movements. The power thus derived is transmitted to the mechanism below the floor for propelling the car. The gear mechanism is so constructed and arranged that the horse does not step faster than the ordinary walking gait, from which a speed of from twelve to eighteen miles per hour is easily obtained. When the horse is first placed in his apartment, the brake mechanism is turned on hard, so that the horse may walk up onto the tread and be hitched by the halter to the front part of the frame of the motor. Now, when the car is to move ahead, the man on the front platform throws the lever S over to the right, thus throwing the sleeve K into gear with the gear I. Then, by slacking up on the brake, the weight of the horse begins to cause the tread to move down the incline, and as the halter begins to draw the horse begins to walk, and thereby keeps up the movements. Now, should it be desirable at any time to stop the car, the man turns the brake on hard enough to hold the tread from moving, so that the horse, finding that the tread no longer moves from under him, ceases to walk, as he cannot walk off, and as soon as the brake is again slackened the horse must resume his walking, so that the horse needs no driving or urging, and thus the movements of the horse, the motor, and the car are under the perfect control of the man at the front.

From the foregoing it will be seen that there are many advantages derived from this system of propulsion, chief among which are speed and economy, as by the use of one horse more than double the speed is obtained than has been possible heretofore with two horses, and, furthermore, much may be dispensed with that has been heretofore required—such as the number of horses, their harness, and the frequency of shoeing the horses. Besides, the horses are protected from heat in summer and cold in the winter seasons, and while the car may not carry quite so large a number of passengers, yet that is fully compensated for by the comfort and convenience of the passengers and by the possibility of running twice the number of cars with the same number of horses employed by the old method.

Having described my invention, I claim—

1. The combination, in a car provided with a central apartment, of a horse-power motor consisting of an inclined endless-belt tread, B, gears C c, and sprocket-wheel D, connected by chain belt F to a sprocket-wheel, E, beneath the car, and operating suitable mechanism for propelling the car, substantially as described.

2. In a car provided with a central apartment, a horse-power motor consisting of an inclined endless-belt tread, B, gears C c, and sprocket-wheel D, connected by chain belt F with sprocket-wheel E on shaft G, having a shifting spool-shaped sleeve connected with gear I on counter-shaft H, having gear J, meshing with and operating gear L on the axle M of the car, all constructed, combined, and arranged to operate substantially as described.

3. In a car provided with a central apartment and a horse-power motor consisting of an inclined endless-belt tread, B, gears C c, and sprocket-wheel D, connected by chain-belt F with sprocket-wheel E on shaft G, a shifting mechanism consisting of a spool-shaped sleeve, K, on shaft G, and having a yoke, Y, pivoted to a lever, R, fulcrumed to the car-body and extending forward and connected to a vertical hand-lever, S, fulcrumed in the floor of the platform, and engaging with a rack, T, for changing contact of said spool with the propelling mechanism, substantially as and for the purpose specified.

4. In a car provided with a central apartment and a horse-power motor consisting of an endless-belt tread, B, gears C c, and sprocket-wheel D, a brake-lever, U, fulcrumed to and extending below the floor, and connected by a rod and chain, V, to a vertical shaft, W, provided with hand-wheel X, fixed to the front part of the platform, substantially as shown, and for the purpose specified.

AUGUSTUS W. GETCHELL.

Witnesses:
GEO. W. TIBBITTS,
F. W. CADWELL.